(12) United States Patent
Leborgne et al.

(10) Patent No.: US 11,781,588 B2
(45) Date of Patent: Oct. 10, 2023

(54) LOCKABLE MODULAR CONNECTION DEVICE

(71) Applicant: ArianeGroup SAS, Paris (FR)

(72) Inventors: Florian Leborgne, Montigny-le-Bretonneux (FR); Eric Oguey, Mery-sur-Oise (FR)

(73) Assignee: ARIANEGROUP SAS, Paris (FR)

( * ) Notice: Subject to any disclaimer, the term of this patent is extended or adjusted under 35 U.S.C. 154(b) by 217 days.

(21) Appl. No.: 17/276,960

(22) PCT Filed: Sep. 18, 2019

(86) PCT No.: PCT/FR2019/052184
§ 371 (c)(1),
(2) Date: Mar. 17, 2021

(87) PCT Pub. No.: WO2020/058636
PCT Pub. Date: Mar. 26, 2020

(65) Prior Publication Data
US 2022/0034360 A1 Feb. 3, 2022

(30) Foreign Application Priority Data

Sep. 18, 2018 (FR) ...................................... 1858408

(51) Int. Cl.
 *F16C 11/10* (2006.01)
 *F16C 11/06* (2006.01)
(52) U.S. Cl.
 CPC ........ *F16C 11/106* (2013.01); *F16C 11/0604* (2013.01); *F16C 2326/47* (2013.01)
(58) Field of Classification Search
 CPC combination set(s) only.
 See application file for complete search history.

(56) References Cited

U.S. PATENT DOCUMENTS 3,433,510 A * 3/1969 Hulterstrum ........ F16C 11/0619
 403/77
3,841,769 A * 10/1974 Bowerman ........... F16C 11/106
 248/478

(Continued)

FOREIGN PATENT DOCUMENTS

DE 102011000805 A1 8/2012
EP 3098463 A1 11/2016
WO 9737144 A1 10/1997

OTHER PUBLICATIONS

Search Report issued in French Patent Application No. 1858408 dated Aug. 2, 2019.

(Continued)

*Primary Examiner* — Daniel J Wiley
(74) *Attorney, Agent, or Firm* — Pearne & Gordon LLP

(57) ABSTRACT

A device for providing a lockable modular connection between two parts, the device includes a first element for connecting to one of the parts and a second element for connecting to the other part. The first element includes a rod secured to a ball joint. The second element includes a housing containing the ball joint. The device has an inner space between an inner face of the housing and a peripheral face of the ball joint, and a locking element arranged between the housing and the ball joint. Motifs are arranged on the peripheral face of the ball joint and/or on the inner face of the housing. The locking element consists of a hardened material that fills the entire inner space and with regard to which the motifs form abutments in order to hold the ball joint in a fixed position in the housing.

10 Claims, 3 Drawing Sheets

(56) References Cited

U.S. PATENT DOCUMENTS

| | | | | |
|---|---|---|---|---|
| 4,620,813 | A | * | 11/1986 | Lacher ................ F16C 11/106 403/93 |
| 4,642,864 | A | * | 2/1987 | Metcalfe ................ F16B 1/00 165/4 |
| 5,897,417 | A | * | 4/1999 | Grey ...................... F16M 11/14 403/90 |
| 6,561,476 | B2 | * | 5/2003 | Carnevali .............. F16M 11/14 248/181.1 |
| 6,581,892 | B2 | * | 6/2003 | Carnevali .......... F16M 11/2078 403/90 |
| 7,156,358 | B2 | * | 1/2007 | March .................... F16M 13/02 403/90 |
| 10,367,245 | B2 | | 7/2019 | Kerkour et al. |
| 10,856,539 | B2 | * | 12/2020 | Thomas ................ A01K 97/10 |
| 2010/0288438 | A1 | * | 11/2010 | Kobayashi ............ F16B 11/008 285/331 |
| 2020/0144705 | A1 | | 5/2020 | Leborgne |

OTHER PUBLICATIONS

International Search Report for Application No. PCT/FR2019/052184 dated Feb. 10, 2020.
Written Opinion for PCT/FR2019/052184 dated Feb. 10, 2020.
Utility U.S. Appl. No. 17/260,674, "Partially Polymerised Thermohardenable Connection Part and Methods for Producing and Assembling Such a Connection Part", filed Jan. 15, 2021.

* cited by examiner

LOCKABLE MODULAR CONNECTION DEVICE

This is the National Stage of PCT international application PCT/FR2019/052184, filed on Sep. 18, 2019 entitled "LOCKABLE MODULAR CONNECTION DEVICE", which claims the priority of French Patent Application No. 1858408 filed Sep. 18, 2018, both of which are incorporated herein by reference in their entirety.

TECHNICAL FIELD

The present invention relates to a lockable modular connection device between two separate parts.

PRIOR ART

Though not exclusively, the present invention is more particularly applicable to spacecraft equipment.

In such an application, the connection device is intended to be mounted between two parts of the spacecraft equipment, these two parts being capable of having a given angular orientation in relation to one another.

Due to the environment wherein the spacecraft can move, the connection device must be able to ensure the mechanical securing of the separate parts in relation to one another with a suitable angle, while withstanding thermal stress.

Connection elements which are intended to fulfil this type of function are known. However, an item of spacecraft equipment comprises a plurality of pairs of parts capable of having different orientations of angles from one pair of parts to another. Consequently, it is generally common practice to use specific connection elements for each pair of parts.

This routine solution therefore requires a large number of connection elements, which proves to be costly in production and use.

This routine solution is therefore not fully satisfactory for the envisaged applications.

DISCLOSURE OF THE INVENTION

The aim of the present invention is to remedy these drawbacks.

It relates to a lockable modular connection device between two separate parts, including a first element to be connected to one of the parts and a second element to be connected to the other of the parts.

The first element comprises a rod rigidly connected to a ball joint of overall spherical shape, and the second element is a hollow housing wherein said ball joint is arranged, the housing overall conforming to the ball joint and being provided with an opening traversed by the rod, said connection device also comprising a space referred to as inner space between an inner face of the housing and a peripheral face of the ball joint facing one another, and a locking element arranged between the housing and the ball joint.

At least one of the ball joint and the housing is provided with patterns respectively on at least a portion of the peripheral face of the ball joint or on at least a portion of the inner face of the housing.

Furthermore, the locking element consists of a hardened material which fills the entirety of said inner space and with respect to which said patterns form stops, to hold said ball joint in a fixed position in said housing.

Thus, thanks to the invention, a connection device is obtained for adapting to the relative angular position required between the two parts via a ball joint type connection generated by the cooperation between said first and second elements, then locking the same position using the locking element and the patterns.

Furthermore, this connection device can be produced in large numbers, without having to take account, beforehand, of the specificities of each pair of parts to be connected to one another. This results in a simplification of the production and assembly of the connection device helping reduce the costs of production and use.

Within the scope of the present invention:
- the term "lockable" refers to the possibility of blocking any movement of the first element formed from the ball joint and the rod with respect to the second element formed by the housing; and
- the term "modular" refers to the possibility of selecting an angular position between the two parts having a given angular orientation in relation to one another.

Preferably, patterns, among said patterns, are arranged on at least a portion of the peripheral face of the ball joint.

Preferably, patterns, among said patterns, are arranged on at least a portion of the inner face of the housing.

In a preferred embodiment, the patterns of the peripheral face of the ball joint and the patterns of the inner face of the housing are complementary.

Advantageously, the housing is provided with at least one filling hole for accessing the inner space.

Moreover, the locking element is preferably made of polymer.

Furthermore, the housing is preferably made of one of the following materials: metallic material, polymer material, composite material, ceramic material.

Preferably, the rod and the ball joint is preferably made of one of the following materials: metallic material, polymer material, composite material, ceramic material.

The present invention also relates to a method for manufacturing a lockable modular connection device as specified above, which is remarkable in that it is of the additive layer manufacturing (or ALM) type.

Furthermore, the present invention also relates to a method for locking a lockable modular connection device as specified above.

According to the invention, this locking method comprises:
- a step of relative angular orientation between the two parts, via an angular orientation between the first element and the second element; then
- a filling step, of filling the entire inner space with a fluid material intended to form the locking element, the fluid material being introduced via said at least one filling hole with which the housing is provided; and
- a step of forming the locking element by hardening the fluid material, whereby the locking element locks the relative angular orientation between the two parts.

BRIEF DESCRIPTION OF THE FIGURES

The appended figures will ensure clear understanding of how the invention can be embodied. In these figures, identical references designate similar elements. More particularly.

DETAILED DESCRIPTION

Figure 1:
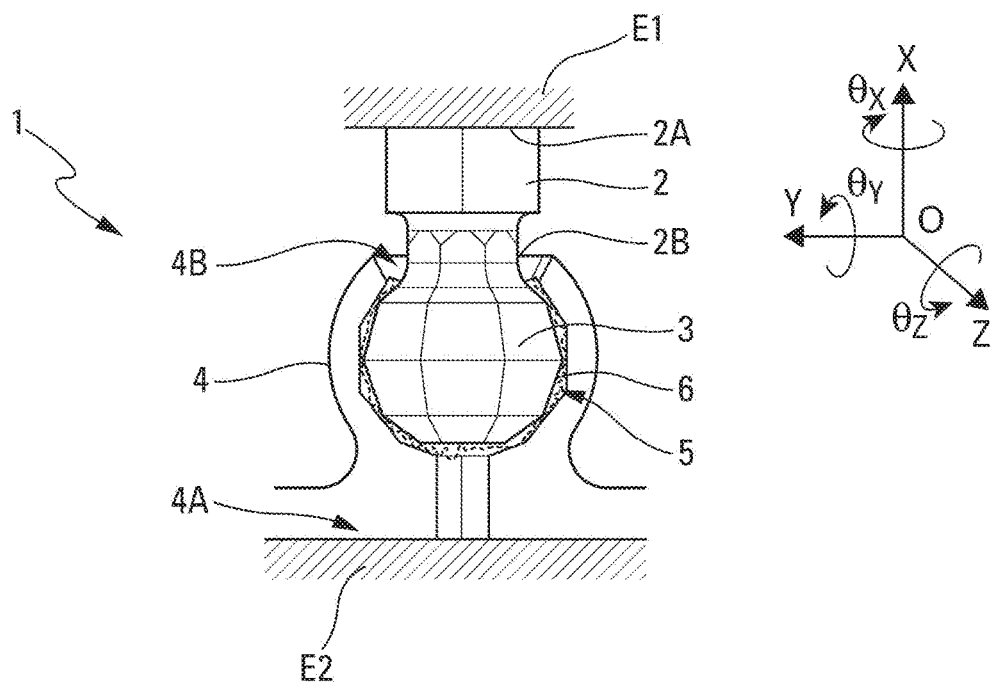
FIG. 1 is a schematic perspective view of a connection device, according to a preferred embodiment.

The lockable modular connection device 1 (hereinafter "connection device 1"), represented schematically in an embodiment in FIG. 1, is intended to make a connection between two separate mechanical parts E1 and E2. This lockable modular connection device 1 comprises a first element intended to be connected to one of the parts E1 and a second element intended to be connected to the other part E2. These parts E1 and E2 are represented partially and very schematically in FIG. 1.

As shown in FIG. 1, the first element comprises a rod 2 of elongated shape, rigidly connected by a first end 2A to the part E1 and a ball joint 3 rigidly connected to the rod 2 by a second end 2B thereof, opposite the first end 2A.

The ball joint 3 is arranged in a hollow housing 4. The housing 4, representing said second element, conforms to the shape of the ball joint 3. Furthermore, the housing 4 is rigidly connected by a base 4A to the part E2. The housing 4 is also provided with an opening 4B arranged in an opposite manner to the base 4A of the housing 4. The opening 4B is traversed by the rod 2.

Hereinafter in the description, a reference R associated with the connection device 1 and defined according to a centre O corresponding to the centre of the ball joint 3 and three orthogonal axes, namely one so-called longitudinal axis X which is oriented along the rod 2, and two median Y and transverse Z axes which define a median plane XY and a transverse plane YZ, is used. For clarity purposes, the reference R is represented next to the connection device 1 in FIGS. 1, 2a and 2b. Furthermore, the adjectives "inner" and "peripheral" are defined with respect to the radial direction from the centre O along any one of the longitudinal X, median Y and transverse Z axes, respectively towards the centre O and towards the outside of the ball joint 3.

Figures 2A, 2B:
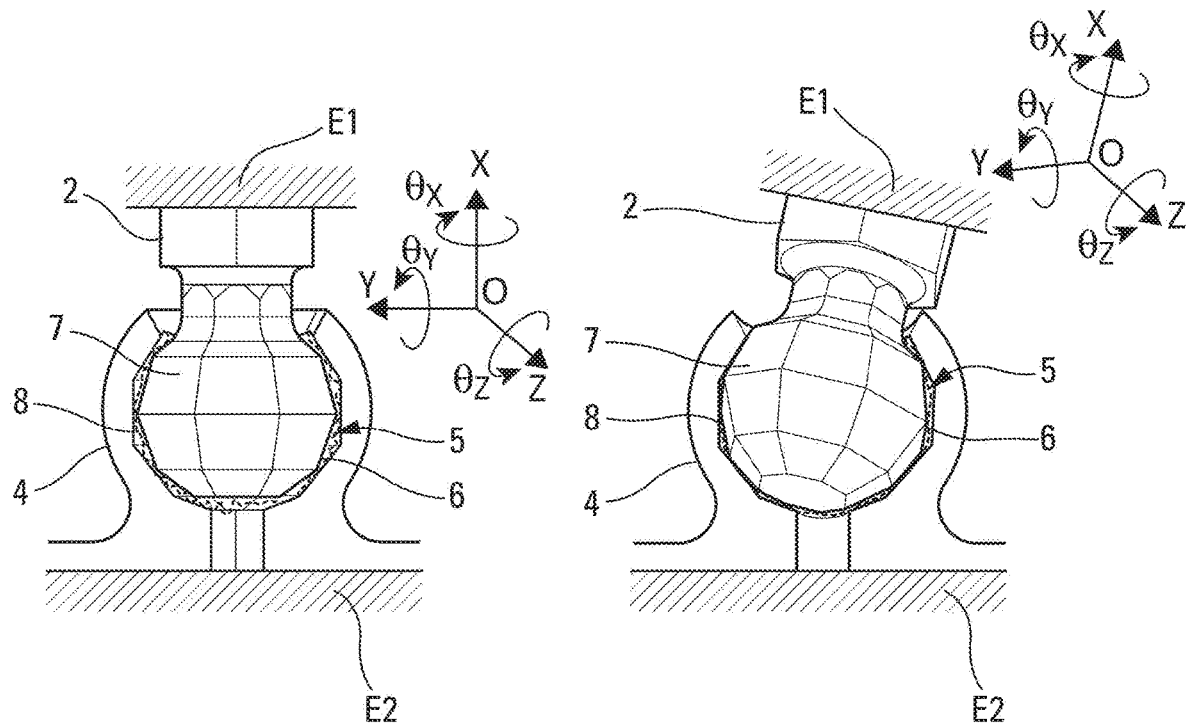
FIGS. 2a and 2b are schematic perspective views of a portion of a connection device, in two different angular positions.

In a preferred embodiment represented in FIGS. 1, 2a and 2b, the ball joint 3 is of overall spherical shape. The ball joint 3 is provided with a peripheral face 7, which is facing an inner face 8 of the housing 4. The connection device 1 further comprises an inner space 5 between the inner face 8 of the housing 4 and the peripheral face 7 of the ball joint 3.

The conformation of the housing 4 to the shape of the ball joint 3 renders the ball joint 3 capable of making rotating movements about the three longitudinal X, median Y and transverse Z axes (FIGS. 2a and 2b). The ball joint 3 being rigidly connected to the rod 2, the rotary movements thereof correspond to rotating movements of the rod 2. The permitted rotations for the ball joint 3 define an angle θx when it consists of a rotation about the longitudinal axis X, an angle θy when it consists of a rotation about the median axis Y and an angle θz when it consists of a rotation about the transverse axis Z.

The opening 4B of the housing 4, which is, preferably, of circular cross-section, delimits the maximum angles θymax or θzmax of rotation of the rod 2 and the ball joint 3 about the median Y and transverse Z axes. Furthermore, the conformation of the housing 4 prevents any translation movement of the ball joint 3 along the longitudinal X, median Y and transverse Z axes. As represented in FIG. 2a, the parts E1 and E2 can be arranged in transverse planes YZ, parallel with one another and perpendicular to the longitudinal axis X through which the rod 2 passes. In such a configuration, the respective positions of parts E1 and E2 in relation to one another can correspond to a relative angular orientation defined by an angle θx (not shown). As shown in FIG. 2b, the rotation of the first element comprising the ball joint 3 and the rod 2 with respect to the second element comprising the housing 4, is possible about the median Y and transverse Z axes. Thus, a rotation of the rod 2 and the ball joint 3 in the housing 4 with respect to the transverse axis Z induces a relative angular orientation between the first and second elements and therefore between the parts E1 and E2 of angle θz. The rotation of the ball joint 3 and therefore of the rod 2 in the housing 4 with respect to the median axis Y induces a relative angular orientation between the first and second elements and therefore between the parts E1 and E2 of angle θy. The relative angular orientation between the first element comprising the rod 2 and the ball joint 3 and the second element comprising the housing 4 is defined by the value of the angles θx, θy and/or θz shown in FIGS. 1, 2a and 2b. This relative angular orientation is representative of the angular orientation between the parts E1 and E2.

Figure 4A:
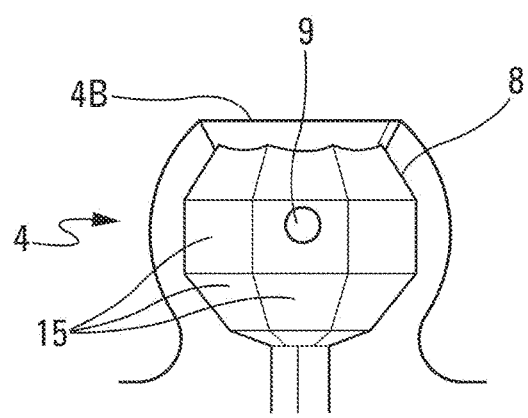
FIGS. 4a and 4b are schematic longitudinal cross-sectional views of a housing of the connection device, respectively viewed from the front and diagonally.
Figure 4B:
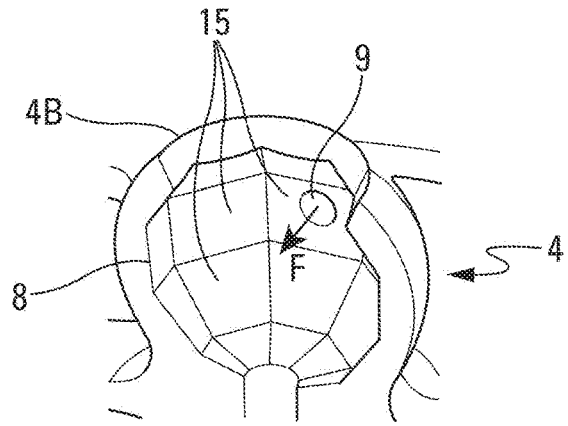

Moreover, as represented in FIGS. 4a and 4b, the housing 4 is provided with a hole 9 referred to as filling hole. In a particular embodiment, said filling hole 9 makes it possible to access, from a peripheral face of the housing 4, the inner space 5.

In a particular embodiment not shown, the housing 4 can be provided with a plurality of filling holes, distributed homogeneously or not around the periphery of the housing 4.

Furthermore, the connection device 1 comprises a locking element 6 arranged between the housing 4 and the ball joint 3. This locking element 6 is capable of filling at least a portion of the inner space 5 between the inner face 8 of the housing 4 and the peripheral face 7 of the ball joint 3 to hold the ball joint 3 in a fixed position in the housing 4. The locking element 6 is, preferably, made of an elastomer type material. This type of material makes it possible to damp the vibrations and/or shocks to which the connection device 1 can be subjected during the use thereof.

In an alternative embodiment, the locking element 6 is a metal. Furthermore, in a particular embodiment, the locking element 6 comprises a foam or a resin. This resin can be thermosetting or thermoplastic.

In a preferred embodiment, the locking element 6 is introduced into the inner space 5 via said at least one filling hole 9 in order to fill the inner space 5 and prevent any movement of the ball joint 3 with respect to the housing 4. In an alternative embodiment, the locking element 6 is introduced into the inner space 5 via the opening 4B of the housing 4.

Figure 3A:
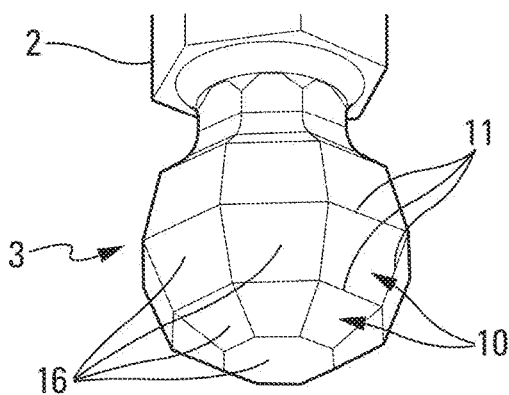
FIGS. 3a to 3d are schematic perspective views of a ball joint of the connection device, provided with different patterns.

In a preferred embodiment, the ball joint 3 is provided with patterns 10 arranged, preferably regularly, on at least a portion of the peripheral face 7 thereof. These patterns 10 form mechanical stops 11 enabling an improvement of the mechanical hold of the connection device 1 by the locking element 6. In the example in FIG. 3a, these patterns 10 correspond to planar facets 16 arranged regularly. The edges of each facet 16 form mechanical stops 11.

Figure 3B:
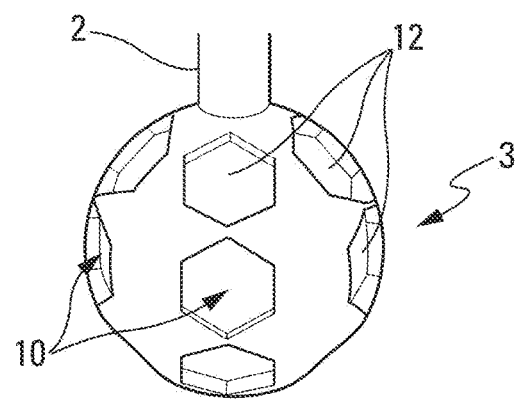
Figure 3C:
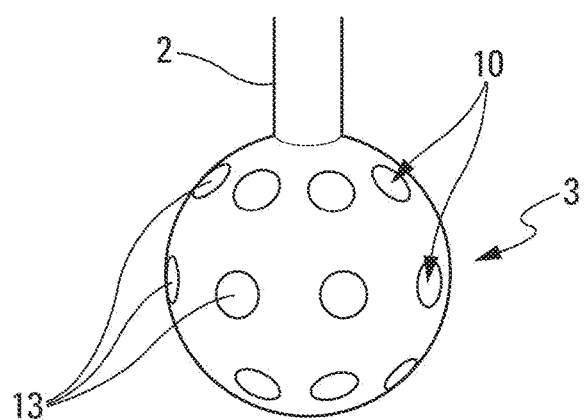

In a further embodiment represented in FIGS. 3b and 3c, the ball joint 3 is provided with a plurality of cells 12, for example of hexagonal shape, or of holes 13 of circular cross-section, arranged regularly on the peripheral face 7 thereof.

Figure 3D:
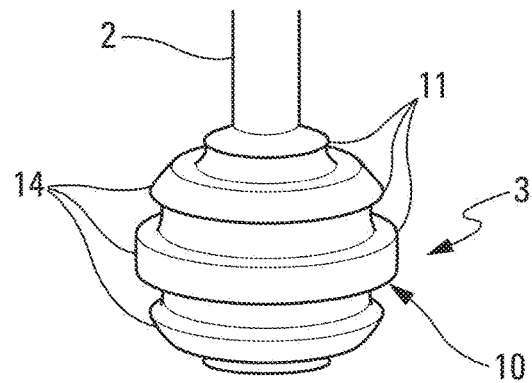

In a further embodiment represented in FIG. 3d, the peripheral face 7 of the ball joint 3 is provided with a plurality of striations 14 arranged in the transverse plane YZ. These striations 14 form the mechanical stops 11 for the locking element 6.

These cells 12, these holes 13 and these striations 14 represent further (non-limiting) examples of patterns 10 of the peripheral face 7 with which the ball joint 3 can be provided.

In a preferred embodiment, the housing 4 is also provided with patterns 15 on at least a portion of the inner face 8 thereof, as shown in FIGS. 4a and 4b. These patterns 15 correspond to planar facets arranged regularly. These patterns 15 also form mechanical stops 11 for improving the mechanical hold of the connection device 1 by the locking element 6. Further examples of patterns 15 can, obviously, be envisaged.

In the preferred embodiment represented in FIGS. 1, 2a and 2b, the patterns 10 and 15 present on the peripheral face 7 of the ball joint 3 and on the inner face 8 of the housing 4 are complementary.

The connection device 1, as described above, can be manufactured according to various manufacturing methods. In a preferred embodiment, the manufacturing method is of the additive layer manufacturing (or ALM) type, i.e. it carries out 3D printing. The rod 2, the ball joint 3 and the housing 4 are made, preferably, of a metallic or polymer structure material. This additive layer manufacturing method makes it possible, inter alia, to obtain a connection device 1 which directly incorporates the functions of angular positioning and of attached to the parts E1 and E2, by removing the additional assembly phases normally required.

In a further embodiment, the connection device 1 is manufactured in the usual manner, by inserting the ball joint 3 rigidly connected to the rod 2 into the hollow housing 4 consisting of two portions which are, subsequently, attached to one another.

Moreover, the housing 4 is made of a metallic, polymer, composite or ceramic type material.

Furthermore, the rod 2 and the ball joint 3 are made of a metallic, polymer, composite or ceramic type material.

The positioning and the conditions of use of the connection device 1 are explained hereinafter.

By way of example, the parts E1 and E2 can form a pair of parts attached to an item of spacecraft equipment. According to the varied connection needs on such equipment and due to the mechanical, vibratory and/or thermal stress to which the spacecraft equipment can be subjected during use, the parts E1 and E2 have an arrangement having a given angular orientation in relation to one another.

Independently, the elements of the connection device 1 comprising the rod 2, the ball joint 3 and the housing 4 are manufactured, preferably by means of an additive layer manufacturing type method. These elements form a tappet ball joint type link, the angular orientation of which between the first and the second element is, subsequently, locked by the locking element 6.

During an angular orientation step S1, the rod 2 is made perform a rotary movement about one or more of the longitudinal X, median Y and/or transverse axes so as to match the angular orientation between the first element and the second element with the relative angular orientation between the parts E1 and E2. The rod 2 being rigidly connected to the ball joint 3, the rotary movements thereof cause identical rotary movements of the ball joint 3 in the housing 4. The presence of the initially empty inner space 5 between the peripheral face 7 of the ball joint 3 and the inner face 8 of the housing 4 allows such movements. The rotary movements of the rod 2 and therefore of the ball joint 3 are delimited by maximum angles θymax and θzmax around the median Y and transverse Z axes, respectively. These two maximum angles are dependent on the size of the opening 4B of the housing 4. On the other hand, the rotary movement of the first element comprising the rod 2 and the ball joint 3 in the housing 4, corresponding to the second element, is not limited around the longitudinal axis X. Thus, the position of the rod 2 with respect to the base 4A of the housing 4, this position being within the limits permitted by the opening 4B of the housing 4, is representative of the angular orientation sought between the two parts E1 and E2.

During a subsequent filling step S2, the locking element 6 in fluid form, preferably an elastomer material, is introduced into the housing 4. As illustrated by an arrow F in FIG. 4b, the locking element 6 is introduced via the filling hole 9 so as to fill the inner space 5 between the ball joint 3 and the housing 4. More particularly, the locking element 6 fills the space between the patterns 10 of the peripheral face 7 of the ball joint 3 and the patterns 15 of the inner face of the housing 4. Thus, the assembly formed by the rod 2, the ball joint 3 and the housing 4 corresponds to a tappet ball joint type connection wherein angular displacement is rendered impossible by the presence of the locking element 6.

The locking element 6, during a subsequent locking step S3, dries. By way of example, the drying of the locking element 6 is performed by heating the connection device 1. Once dried, the locking element 6 fixes the position of the ball joint 3 in the housing 4 and therefore of the rod 2. In a preferred embodiment, the rod 2 is then rendered rigidly connected to the part E1 by the end 2A thereof by any suitable means and the housing 4 is rendered rigidly connected to the part E2 by the base 4B thereof by any suitable means.

Figure 5A:
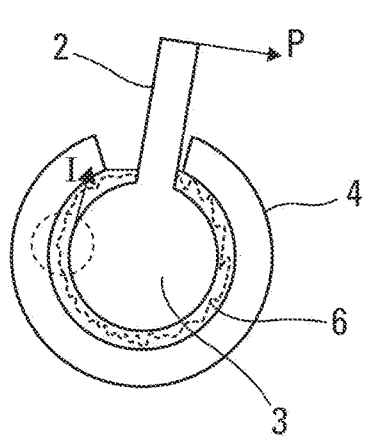
FIGS. 5a and 5b are schematic longitudinal cross-sectional views of the forces capable of acting upon the connection device, respectively, in the absence and in the presence of patterns on the first and second elements.
Figure 5B:
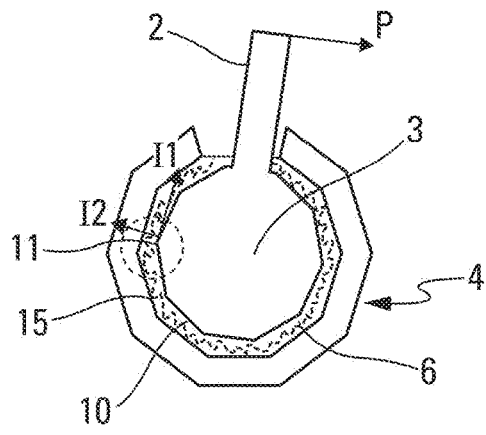

As shown in FIGS. 5a and 5b, the connection device 1 can be subjected to mechanical forces and vibrations during the use thereof, on an item of spacecraft equipment in particular. These mechanical forces are represented by an arrow P. In the absence of patterns 10 on the peripheral face 7 of the ball joint 3 and/or patterns 15 on the inner face 8 of the housing 4, the mechanical forces induce internal shears I tangential to the interfaces between the locking element 6 and the peripheral face 7 of the ball joint 3.

The presence of patterns 10 on the peripheral face 7 of the ball joint 3 and/or patterns 15 on the inner face 8 of the housing 4 generates mechanical stops 11. The mechanical forces P generated during the use of the connection device 1 then induce compression components I1 and I2. These compressions are absorbed by the locking element 6. This decomposition of the mechanical forces along several axes enables a superior mechanical hold of the connection device 1.

What is claimed is:

1. A lockable modular connection device configured for connecting two separate parts of a spacecraft equipment, said connection device including a first element intended to be connected to one of the parts and a second element intended to be connected to the other of the parts, wherein the first element comprises a rod rigidly connected to a ball joint of overall spherical shape, the second element comprises a hollow housing wherein said ball joint is arranged, the housing overall conforming to the ball joint and being provided with an opening traversed by the rod, wherein said connection device also comprises a space referred to as inner space between an inner face of the housing and a peripheral face of the ball joint facing one another, and a locking element arranged between the housing and the ball joint, and wherein at least one of the ball joint and the housing is provided with patterns respectively on at least a portion of the peripheral face of the ball joint or on at least a portion of the inner face of the housing, wherein the locking element consists of a hardened material which fills the entirety of said inner space and with respect to which said patterns form stops, to hold said ball joint in a fixed position in said housing.

2. The lockable modular connection device according to claim 1, wherein the ball joint is provided, on the at least a portion of the peripheral face thereof, with patterns.

3. The lockable modular connection device according to claim 1, wherein the housing is provided, on the at least a portion of the inner face thereof, with patterns.

4. The lockable modular connection device according to claim 1, wherein the ball joint is provided, on the at least a portion of the peripheral face thereof, with patterns, wherein the housing is provided, on the at least a portion of the inner face thereof, with patterns, and wherein the patterns of the peripheral face of the ball joint and the patterns of the inner face of the housing are complementary.

5. The lockable modular connection device according to claim 1, wherein the housing is provided with at least one filling hole for accessing the inner space.

6. A method for locking a lockable modular connection device according to claim 5, wherein the method for locking the lockable modular connection device comprises:
- a step of relative angular orientation between the two parts, via an angular orientation between the first element and the second element; then
- a filling step, of filling the entire inner space with a fluid material intended to form the locking element, the fluid material being introduced via said at least one filling hole with which the housing is provided; and
- a step of forming the locking element by hardening the fluid material, whereby the locking element locks the relative angular orientation between the two parts.

7. The lockable modular connection device according to claim 1, wherein the locking element is made of polymer.

8. The lockable modular connection device according to claim 1, wherein the housing is made of one of the following materials: metallic material, polymer material, composite material, ceramic material.

9. The lockable modular connection device according to claim 1, wherein the rod and the ball joint are made of one of the following materials: metallic material, polymer material, composite material, ceramic material.

10. A method for manufacturing a lockable modular connection device according to claim 1, wherein the method for manufacturing the lockable modular connection device is of the additive layer manufacturing type.

* * * * *